United States Patent
He

(10) Patent No.: US 11,112,044 B2
(45) Date of Patent: Sep. 7, 2021

(54) ANTI-DROPPING STEEL RING USED IN PRESS-FITTING TYPE PIPE FITTING AND FIXING SEALING DEVICE

(71) Applicant: Zhuji City Howhi Air Conditioners Made Co., Ltd., Zhuji (CN)

(72) Inventor: Yuguang He, Zhuji (CN)

(73) Assignee: Zhuji City Howhi Air Conditioners Made Co., Ltd., Zhuji (CN)

( * ) Notice: Subject to any disclaimer, the term of this patent is extended or adjusted under 35 U.S.C. 154(b) by 306 days.

(21) Appl. No.: 16/315,453

(22) PCT Filed: Oct. 9, 2018

(86) PCT No.: PCT/CN2018/109419
§ 371 (c)(1),
(2) Date: Jan. 4, 2019

(87) PCT Pub. No.: WO2020/073188
PCT Pub. Date: Apr. 16, 2020

(65) Prior Publication Data
US 2020/0109805 A1    Apr. 9, 2020

(51) Int. Cl.
*F16L 37/091*    (2006.01)
*F16L 21/03*    (2006.01)
*F16L 37/05*    (2006.01)

(52) U.S. Cl.
CPC ............ *F16L 37/091* (2013.01); *F16L 21/03* (2013.01); *F16L 37/05* (2013.01)

(58) Field of Classification Search
CPC ....... F16L 37/091; F16L 21/03; F16L 13/142; H02G 3/065

USPC ......................................................... 285/340
See application file for complete search history.

(56) References Cited

U.S. PATENT DOCUMENTS

| 5,553,901 A * | 9/1996 | Serot ..................... F16L 37/091 285/340 |
| 7,316,429 B2 * | 1/2008 | Viegener ............... F16L 13/142 285/340 |
| 8,474,877 B2 * | 7/2013 | Smith .................... H02G 3/065 |
| 8,517,431 B2 | 8/2013 | Arning et al. |
| 9,234,611 B2 | 1/2016 | Arning et al. |

(Continued)

FOREIGN PATENT DOCUMENTS

| CN | 102308136 A | 1/2012 |
| DE | 10335530 A1 | 10/2004 |

(Continued)

OTHER PUBLICATIONS

PCT; App. No. PCT/CN2018/109419; International Search Report dated Dec. 6, 2018; pp. 1-5.

*Primary Examiner* — Zachary T Dragicevich
(74) *Attorney, Agent, or Firm* — Fitch, Even, Tabin & Flannery LLP

(57) ABSTRACT

An anti-dropping steel ring used in a press-fitting type pipe fitting includes an anti-dropping steel ring, wherein the anti-dropping steel ring is provided with first snapping parts and second snapping parts distributed in a circumferential direction, the first snapping part is configured to extend from an inner circumferential wall of the anti-dropping steel ring in a radial direction, and the second snapping part is configured to extend from a circumferential edge of the anti-dropping steel ring in an axial direction and lean inwards.

24 Claims, 5 Drawing Sheets

(56) References Cited

U.S. PATENT DOCUMENTS

| | | |
|---|---|---|
| 2012/0001414 A1 | 1/2012 | Arning et al. |
| 2013/0292939 A1 | 11/2013 | Arning et al. |
| 2015/0137515 A1* | 5/2015 | Ratschmann ......... F16L 37/091 |
| | | 285/340 |
| 2015/0308595 A1* | 10/2015 | Lee ........................ F16L 21/03 |
| 2018/0313478 A1* | 11/2018 | Lawrence ............... F16L 21/03 |
| 2019/0170277 A1* | 6/2019 | Kost ..................... F16L 13/142 |

FOREIGN PATENT DOCUMENTS

| | | |
|---|---|---|
| GB | 2182743 A | 5/1987 |
| WO | 2010089188 A1 | 8/2010 |

\* cited by examiner

ANTI-DROPPING STEEL RING USED IN PRESS-FITTING TYPE PIPE FITTING AND FIXING SEALING DEVICE

CROSS-REFERENCE TO RELATED APPLICATION

This application is a U.S. national phase application filed under 35 U.S.C. § 371 of International Application No. PCT/CN2018/109419, filed Oct. 9, 2018, designating the United States.

FIELD OF THE INVENTION

The present invention relates to a fitting for a press-fitting type pipe fitting, and in particular to an anti-dropping steel ring used in a press-fitting type pipe fitting and a fixing sealing device.

DESCRIPTION OF THE PRIOR ART

A press-fitting type pipe fitting made of materials such as copper, stainless steel, and carbon steel has been popularized rapidly in aspects such as water supply, heating supply, and gas supply due to its advantages such as convenient installation, security and reliability, and environmental protection.

Currently, a steel ring, which is provided with a row of tines against a pipe dropping direction to ensure an anti-dropping performance of a pipe, is generally embedded in a commonly used fixing sealing device of the press-fitting type pipe fitting. A plastic ring is placed between the steel ring and a sealing ring, to prevent the sealing ring from being damaged by the tines of the steel ring. However, because there is only one row of tines on the steel ring, it cannot be effectively ensured that a pipe inserted into the pipe fitting does not drop under an impact of an inner pressure or an outer tension. An outer diameter size of the steel ring is reduced after press-fitting; therefore, an existing design is to open a parallel notch on the circumference of the steel ring, and the notch is closed after the press-fitting. However, during a pipe dropping process, the notch is extremely easy to be dislocated, which results in degradation of the anti-dropping performance of the steel ring, and further damages a sealing performance. The plastic ring placed between the steel ring and the sealing ring is made of rigid plastic, so as to ensure a supporting function thereof. In a case in which the outer diameter size is reduced after the press-fitting, the plastic ring bends because it cannot compress and can only deform in a pipe direction, and the sealing ring part deforms correspondingly, thereby damaging the sealing performance of the sealing ring.

Therefore, one skilled in the art aims at developing a fixing sealing device that can improve an anti-dropping strength and a sealing performance of the press-fitting type pipe fitting after press-fitting, to overcome the problem existing in the prior art.

SUMMARY OF THE INVENTION

In view of the above-mentioned defects of the prior art, the technical problem to be solved by the present invention is how to improve an anti-dropping strength and a sealing performance of a press-fitting type pipe fitting after press-fitting.

In order to achieve the above-described objective, the present invention provides an anti-dropping steel ring used in a press-fitting type pipe fitting, wherein the anti-dropping steel ring is provided with first snapping parts and second snapping parts distributed in a circumferential direction, the first snapping part is configured to extend from an inner circumferential wall of the anti-dropping steel ring in a radial direction, and the second snapping part is configured to extend from a circumferential edge of the anti-dropping steel ring in an axial direction and lean inwards.

Further, the first snapping part and the inner circumferential wall of the anti-dropping steel ring are molded integrally.

Further, the first snapping part is a toothed protrusion obtained by stamping the inner circumferential wall of the anti-dropping steel ring.

Further, the first snapping part and the second snapping part are staggered with respect to each other in the circumferential direction.

Further, the anti-dropping steel ring is provided with a first interface part and a second interface part, the first interface part is a convex part, the second interface part is a concave part that can accommodate the convex part, and the first interface part and the second interface part are configured to implement closing of the anti-dropping steel ring by means of cooperation of the concave part and the convex part.

Further, both the first interface part and the second interface part are configured to be V-shaped.

The present invention further provides a fixing sealing device comprising the anti-dropping steel ring according to any one of claims 1-5, wherein a press-fitting end of the fixing sealing device is provided with a mounting part; the anti-dropping steel ring, a plastic washer, and a sealing ring are disposed in the mounting part; and the plastic washer is located between the anti-dropping steel ring and the sealing ring.

Further, an outer side of the plastic washer is provided with a hook-shaped flange, and a groove is formed between the hook-shaped flange and the plastic washer.

Further, the hook-shaped flange is a thin wall structure, and the groove is configured to be compressible when being pressed.

Further, both the first snapping part and the second snapping part of the anti-dropping steel ring face towards a positioning end of the fixing sealing device.

Compared with the prior art, the present invention has the following specific beneficial effects:
(1) Designs of the first snapping part and the second snapping part of the anti-dropping steel ring can effectively ensure that a pipe inserted into the pipe fitting does not drop under an impact of an inner pressure or an outer tension;
(2) Obtaining the first snapping part by stamping the inner circumferential wall of the anti-dropping steel ring simplifies a process and saves a cost;
(3) The first snapping part and the second snapping part are staggered with respect to each other in the circumferential direction, so that the anti-dropping steel ring bears uniform forces when being pressed;
(4) Both the first snapping part and the second snapping part face towards an inside of the press-fitting type pipe fitting and against a pipe dropping direction, so that the pipe can be fixed in the same direction and prevented from dropping;
(5) The first interface part and the second interface part have V-shaped structures, so that the pipe is not easy to be dislocated during a pipe dropping process, thereby improving an anti-dropping performance of the steel ring;
(6) The hook-shaped flange is designed at the outer side of the plastic washer, the hook-shaped flange is a thin wall structure, and the compressible groove is provided between the hook-shaped flange and the plastic washer, to avoid deforming and bending of the plastic washer in a pipe direction after the press-fitting, which damage the sealing ring.

The concept, specific structure, and produced technical effects of the present invention will be further described below with reference to the drawings, so as to fully understand the purposes, features and effects of the present invention.

DETAILED DESCRIPTION OF THE PREFERRED EMBODIMENTS

Multiple preferred embodiments of the present invention are described below with reference to the drawings of the description, to make the technical content clearer and easier to be understood. The present invention can be implemented by many embodiments in different forms, and the protection scope of the present invention is not limited to the embodiments described below.

Figure 1:
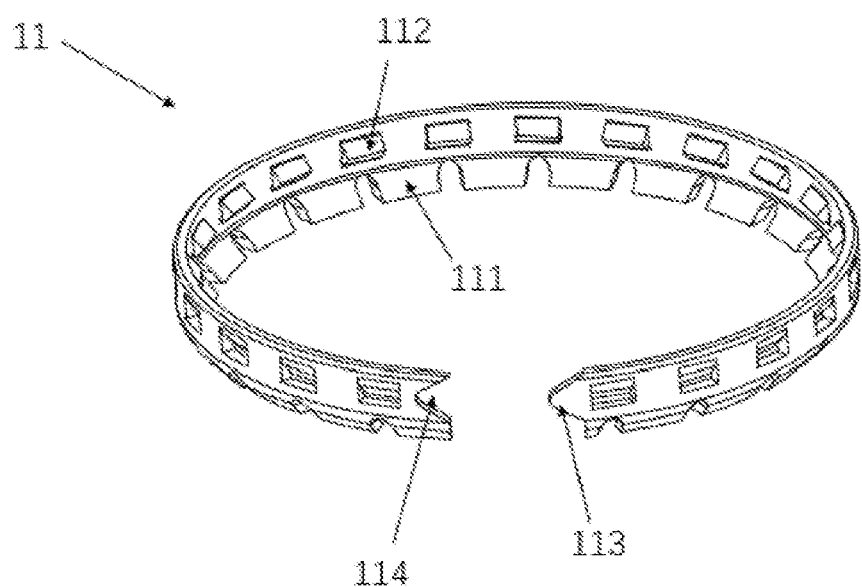
FIG. 1 is a schematic view of an anti-dropping steel ring according to one specific implementation of the present invention.

FIG. 1 shows a specific embodiment of the present invention. An inner wall of an anti-dropping steel ring 11 is provided with a row of first snapping parts 112 distributed at intervals in a circumferential direction, and a row of second snapping parts 111 distributed at intervals in the circumferential direction extend from a circumferential edge on one side of the anti-dropping steel ring 11 in an axial direction. A bottom of the first snapping part 112 is formed by means of stamping, which helps to simplify the process and save costs. The first snapping part 112 and the second snapping part 111 are arranged to be staggered with respect to each other in the circumferential direction. When pressed, the first snapping part 112 and the second snapping part 111 are snapped within an outer wall material of a pipe 2, and a design of a staggered arrangement enables the anti-dropping steel ring to bear uniform forces.

In another specific embodiment of the present invention, the inner wall of the anti-dropping steel ring 11 is provided with multiple rows of first snapping parts 112 distributed in the circumferential direction, and a row of second snapping parts 111 distributed at intervals in the circumferential direction extend from the circumferential edge on one or two sides of the anti-dropping steel ring 11 in the axial direction. The multiple rows of first snapping parts 112 can be arranged to be staggered with respect to each other.

A first interface part of the anti-dropping steel ring 11 is a convex part 113, and a second interface part of the anti-dropping steel ring 11 is a concave part 114 that can accommodate the convex part 113. The convex part 113 and the concave part 114 cooperate to implement closing of the anti-dropping steel ring 11. In this embodiment, both structures of the convex part 113 and the concave part 114 are V-shaped structures. For a press-fitting type pipe fitting 3 subject to press-fitting, a diameter of the anti-dropping steel ring 11 is reduced. The convex part 113 cooperates with the concave part 114. When an inner pressure or an outer tension is imposed, due to its shape feature, the V-structure can effectively prevent the anti-dropping steel ring 11 from being dislocated in a direction of the pipe 2, thereby ensuring the anti-dropping strength and the sealing performance.

Figure 2:
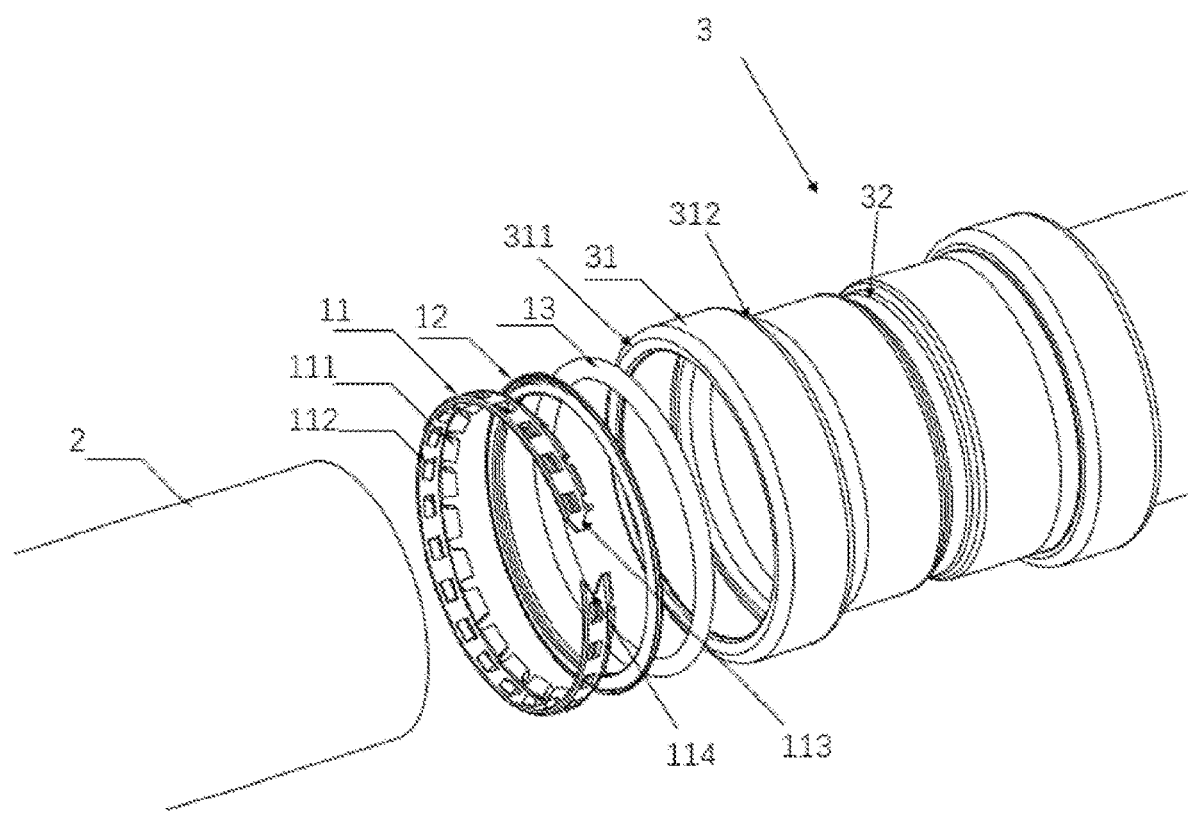
FIG. 2 is a schematic exploded view for mounting of a fixing sealing device before press-fitting according to one specific implementation of the present invention.
Figure 3:
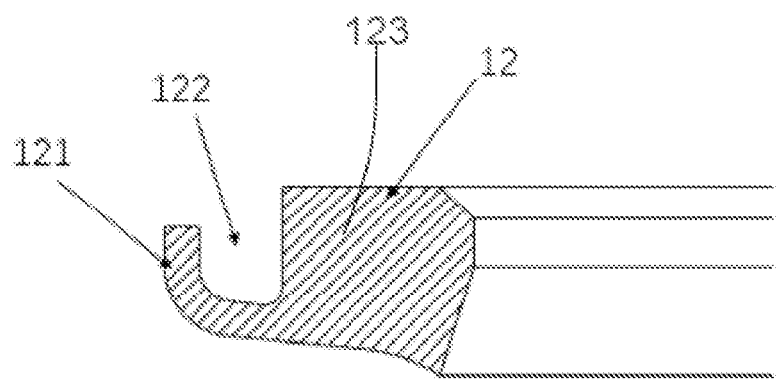
FIG. 3 is an enlarged schematic cross-sectional view of a plastic washer according to one specific implementation of the present invention.

FIG. 2 and FIG. 3 show another specific embodiment of the present invention. A press-fitting end of a fixing sealing device 3 is provided with a mounting part 31. The mounting part 31 has a first side edge 311 and a second side edge 312. The second side edge 312 leans inward to be integrally connected with the fixing sealing device 3. A cross section of the mounting part 31 is a U-shaped structure. The anti-dropping steel ring 11, a plastic washer 12, and a sealing ring 13 are mounted in the mounting part 31. Both the first snapping part 112 and the second snapping part 111 of the anti-dropping steel ring 11 face towards a positioning end 32 of the fixing sealing device 3. When pressed, an end part of the pipe 2 is located at the positioning end of the fixing sealing device 3, and the first snapping part 112 and the second snapping part 111 are snapped into the outer wall material of the pipe 2, to prevent the pipe 2 from dropping in the axial direction. The press-fitting end of the fixing sealing device 3 is a place where an eternal force is imposed. The positioning end of the fixing sealing device 3 can fix the end part of the pipe 2 inserted thereinto at a specified position.

All of the anti-dropping steel ring 11, the plastic washer 12, and the sealing ring 13 are circular. All outer diameters of the anti-dropping steel ring 11, the plastic washer 12, and the sealing ring 13 are equal to an inner diameter of the mounting part 31 of the fixing sealing device 3, and all inner diameters of the anti-dropping steel ring 11, the plastic washer 12, and the sealing ring 13 are slightly greater than an outer diameter of the pipe 2, to facilitate insertion of the pipe 2 upon mounting. The first side edge 311 and the second side edge 312 fix the anti-dropping steel ring 11, the plastic washer 12, and the sealing ring 13 in the mounting part 31, so that the anti-dropping steel ring 11, the plastic washer 12, and the sealing ring 13 are not easy to drop from the press-fitting pipe fitting 3.

FIG. 3 shows a cross section of the plastic washer 12 between the anti-dropping steel ring 11 and the sealing ring 13. In this embodiment, an outer side of the plastic washer 12 is provided with a hook-shaped flange 121, the hook-shaped flange 121 is a thin wall structure, and a compressible groove 122 is formed between the hook-shaped flange 121 and the body 123 of the plastic washer 12. For the fixing sealing device 3 subject to the press-fitting, due to a shape feature of the groove 122 provided at the outer side of the plastic washer 12, the groove 122 is compressed to be closed, so that the outer diameter of the plastic washer 12 is reduced to prevent deforming and bending of the plastic washer 12 in a direction after the press-fitting, which damage the sealing ring 13. In addition, the anti-dropping steel ring 11 and the sealing ring 13 can be separated effectively, to prevent the sealing ring 13 from being damaged by the first snapping part 112 and the second snapping part 111 on the anti-dropping steel ring 11, thereby implementing reliable sealing.

Figure 4:
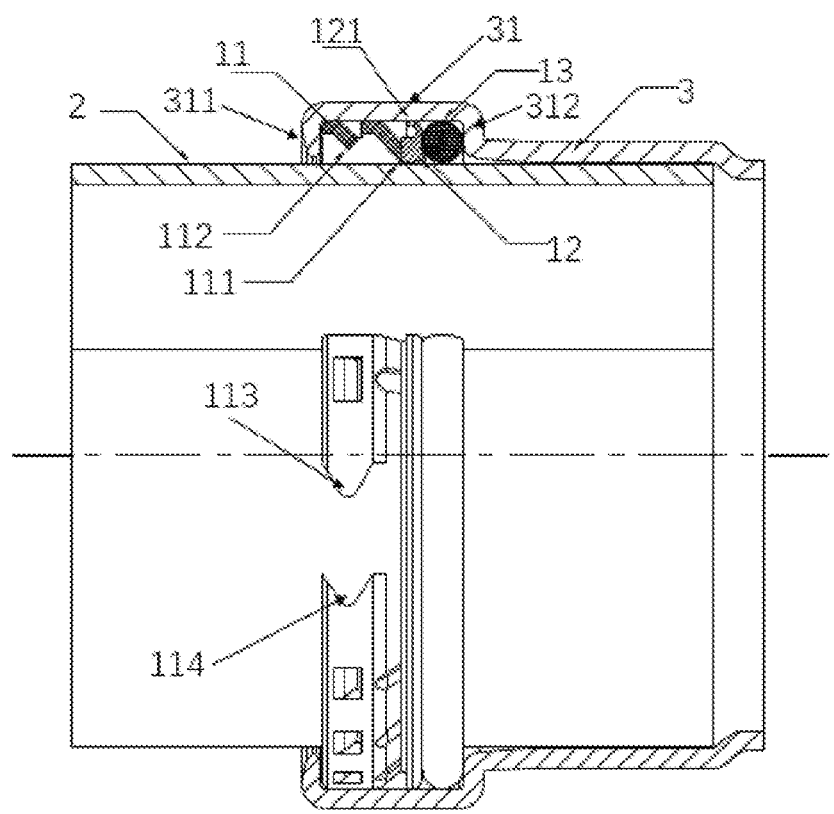
FIG. 4 is a schematic front-sectional view of a fixing sealing device before press-fitting according to one specific implementation of the present invention.
Figure 5:
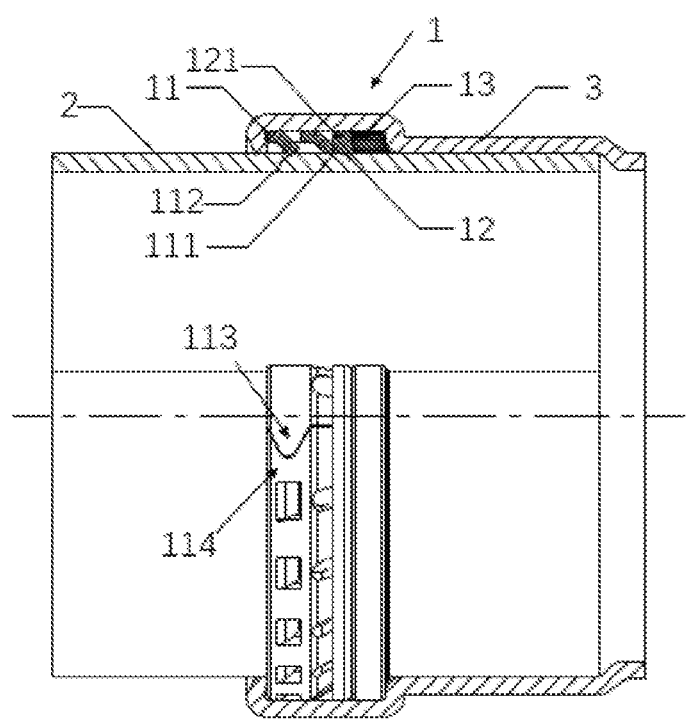
FIG. 5 is a schematic sectional view of a fixing sealing device after press-fitting according to one specific implementation of the present invention.

FIG. 4 and FIG. 5 show another specific embodiment of the present invention. Upon press-fitting, the first side edge 311 of the mounting part 31 is pressed in a radial direction onto the pipe 2. In this case, the diameter of the mounting part 31 is reduced, thereby compelling the diameters of the anti-dropping steel ring 11 and the plastic washer 12 pressing against the first side edge 311 and the sealing ring 13 pressing against the second side edge 312 to be reduced therewith. After the press-fitting is completed, the first snapping part 112 and the second snapping part 111 of the anti-dropping steel ring 11 are snapped into the outer wall material of the pipe 2, the first interface part and the second interface part on the anti-dropping steel ring 11 cooperate with each other to implement closing of the anti-dropping steel ring 11, the groove 122 on the plastic washer 12 is compressed, and the sealing ring 13 is compressed and enduringly presses against the pipe 2 in a sealing manner.

The preferred specific embodiments of the present invention have already been described above in detail. It shall be understood that one skilled in the art could make various modifications and variations according to the concept of the present invention without contributing any inventive labor. Therefore, any technical solution that could be obtained by one skilled in the art through logical analysis, reasoning or limited experiments according to the concept of the present invention based on the prior art shall be included in the protection scope defined by the Claims.

The invention claimed is:

1. An anti-dropping steel ring used in a press-fitting type pipe fitting, the anti-dropping steel ring comprising:
    first snapping parts and second snapping parts distributed in a circumferential direction,
        the first snapping part being configured to extend from an inner circumferential wall of the anti-dropping steel ring in a radial direction, and
        the second snapping part being configured to extend from a circumferential edge of the anti-dropping steel ring in an axial direction and lean inwards;
    wherein the anti-dropping steel ring is provided with a first interface part and a second interface part,
        the first interface part is a convex part,
        the second interface part is a concave part that can accommodate the convex part, and
        the first interface part and the second interface part are configured to implement closing of the anti-dropping steel ring by means of cooperation of the concave part and the convex part;
    wherein both the first interface part and the second interface part are configured to be V-shaped to prevent the anti-dropping steel ring from being dislocated.

2. The anti-dropping steel ring according to claim 1, wherein the first snapping part and the inner circumferential wall of the anti-dropping steel ring are molded integrally.

3. The anti-dropping steel ring according to claim 1, wherein the first snapping part is a toothed protrusion obtained by stamping the inner circumferential wall of the anti-dropping steel ring.

4. The anti-dropping steel ring according to claim 1, wherein the first snapping part and the second snapping part are staggered with respect to each other in the circumferential direction.

5. A fixing sealing device comprising:
    an anti-dropping steel ring according to claim 1,
    a press-fitting end of the fixing sealing device being provided with a mounting part,
    the anti-dropping steel ring, a plastic washer, and a sealing ring being disposed in the mounting part, and the plastic washer being located between the anti-dropping steel ring and the sealing ring.

6. The fixing sealing device according to claim 5, wherein an outer side of the plastic washer is provided with a hook-shaped flange, and
    a groove is formed between the hook-shaped flange and a body of the plastic washer.

7. The fixing sealing device according to claim 6, wherein the groove is configured to be compressible when being pressed.

8. The fixing sealing device according to claim 5, wherein both the first snapping part and the second snapping part of the anti-dropping steel ring face towards a positioning end of the fixing sealing device.

9. The fixing sealing device according to claim 5, wherein the first snapping part and the inner circumferential wall of the anti-dropping steel ring are molded integrally.

10. The fixing sealing device according to claim 9, wherein
    an outer side of the plastic washer is provided with a hook-shaped flange, and
    a groove is formed between the hook-shaped flange and a body of the plastic washer.

11. The fixing sealing device according to claim 10, wherein the groove is configured to be compressible when being pressed.

12. The fixing sealing device according to claim 9, wherein both the first snapping part and the second snapping part of the anti-dropping steel ring face towards a positioning end of the fixing sealing device.

13. The fixing sealing device according to claim 5, wherein the first snapping part is a toothed protrusion obtained by stamping the inner circumferential wall of the anti-dropping steel ring.

14. The fixing sealing device according to claim 13, wherein
    an outer side of the plastic washer is provided with a hook-shaped flange, and
    a groove is formed between the hook-shaped flange and a body of the plastic washer.

15. The fixing sealing device according to claim 14, wherein the groove is configured to be compressible when being pressed.

16. The fixing sealing device according to claim 13, wherein both the first snapping part and the second snapping part of the anti-dropping steel ring face towards a positioning end of the fixing sealing device.

17. The fixing sealing device according to claim 5, wherein the first snapping part and the second snapping part are staggered with respect to each other in the circumferential direction.

18. The fixing sealing device according to claim 17, wherein
    an outer side of the plastic washer is provided with a hook-shaped flange, and
    a groove is formed between the hook-shaped flange and a body of the plastic washer.

19. The fixing sealing device according to claim 18, wherein the groove is configured to be compressible when being pressed.

20. The fixing sealing device according to claim 17, wherein both the first snapping part and the second snapping part of the anti-dropping steel ring face towards a positioning end of the fixing sealing device.

21. The fixing sealing device according to claim 5, wherein the anti-dropping steel ring is provided with a first interface part and a second interface part, the first interface part is a convex part, the second interface part is a concave part that can accommodate the convex part, and the first interface part and the second interface part are configured to implement closing of the anti-dropping steel ring by means of cooperation of the concave part and the convex part.

22. The fixing sealing device according to claim 21, wherein an outer side of the plastic washer is provided with a hook-shaped flange, and a groove is formed between the hook-shaped flange and a body of the plastic washer.

23. The fixing sealing device according to claim 22, wherein the groove is configured to be compressible when being pressed.

24. The fixing sealing device according to claim 21, wherein both the first snapping part and the second snapping part of the anti-dropping steel ring face towards a positioning end of the fixing sealing device.

* * * * *